United States Patent
Zhao et al.

(10) Patent No.: US 10,349,272 B2
(45) Date of Patent: Jul. 9, 2019

(54) VIRTUAL SIM CARD CLOUD PLATFORM

(75) Inventors: Sky Zhao, Beijing (CN); Bernard Smeets, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/369,972

(22) PCT Filed: Dec. 30, 2011

(86) PCT No.: PCT/CN2011/085027
§ 371 (c)(1),
(2), (4) Date: Jun. 30, 2014

(87) PCT Pub. No.: WO2013/097177
PCT Pub. Date: Jul. 4, 2013

(65) Prior Publication Data
US 2015/0017950 A1    Jan. 15, 2015

(51) Int. Cl.
| | |
|---|---|
| H04W 4/60 | (2018.01) |
| H04W 8/18 | (2009.01) |
| H04W 8/20 | (2009.01) |
| H04W 8/26 | (2009.01) |
| H04W 12/04 | (2009.01) |
| H04W 12/06 | (2009.01) |

(52) U.S. Cl.
CPC .......... *H04W 12/06* (2013.01); *H04W 4/60* (2018.02); *H04W 8/18* (2013.01); *H04W 8/20* (2013.01); *H04W 12/04* (2013.01); *H04W 8/265* (2013.01)

(58) Field of Classification Search
CPC ................... H04M 3/00; H04M 1/66
USPC ...... 455/411, 412.1, 410, 414.3, 425; 726/2, 726/4, 9, 17, 20, 21
See application file for complete search history.

(56) References Cited

U.S. PATENT DOCUMENTS

| | | | |
|---|---|---|---|
| 2006/0291455 A1 | 12/2006 | Katz et al. | |
| 2009/0077643 A1 | 3/2009 | Schmidt et al. | |
| 2009/0125996 A1* | 5/2009 | Guccione | H04L 63/0853 726/6 |

(Continued)

FOREIGN PATENT DOCUMENTS

| | | |
|---|---|---|
| CN | 101068424 A | 11/2007 |
| CN | 101222711 A | 7/2008 |

(Continued)

OTHER PUBLICATIONS

Extended European Search Report dated Sep. 11, 2015, issued in European Patent Application No. 11878755.5, 15 pages.

(Continued)

*Primary Examiner* — Jinsong Hu
*Assistant Examiner* — Nicole M Louis-Fils
(74) *Attorney, Agent, or Firm* — Rothwell, Figg, Ernst & Manbeck, P.C.

(57) ABSTRACT

A method of obtaining a virtual SIM for a mobile device comprises sending, to a TTA for authentication, a request for a virtual SIM for a mobile device associated with the TTA. The authenticated request is sent from the mobile device to an NRS application (or to a combined NRS/PCSS application). The mobile device subsequently receives information identifying a PCSS application (or a combined NRS/PCSS application) in a computing environment that provides a virtual SIM for the mobile device.

22 Claims, 9 Drawing Sheets

(56) References Cited

U.S. PATENT DOCUMENTS

| | | | |
|---|---|---|---|
| 2010/0311391 A1* | 12/2010 | Siu | H04W 8/205 455/411 |
| 2011/0060947 A1* | 3/2011 | Song | G06F 21/53 714/37 |
| 2012/0096525 A1* | 4/2012 | Bolgert | G06F 11/3065 726/6 |
| 2012/0108295 A1* | 5/2012 | Schell | H04W 4/001 455/558 |
| 2012/0260090 A1* | 10/2012 | Hauck | H04L 63/0853 713/168 |
| 2012/0260095 A1* | 10/2012 | Von Hauck | H04L 9/3228 713/176 |
| 2013/0035066 A1* | 2/2013 | Nylander | H04W 4/005 455/411 |
| 2013/0067550 A1* | 3/2013 | Chen | H04L 67/10 726/7 |
| 2015/0189578 A1* | 7/2015 | van der Laak | H04W 4/001 455/419 |

FOREIGN PATENT DOCUMENTS

| | | |
|---|---|---|
| CN | 102056135 A | 5/2011 |
| CN | 102196428 A | 9/2011 |
| EP | 1978702 A1 | 10/2008 |
| WO | 2010144479 A2 | 12/2010 |

OTHER PUBLICATIONS

Michael Kasper, "Virtualisation of a SIM-Card using Trusted Computing", Diploma Thesis, (Apr. 30, 2007), URL:http://sit.sit.fraunhofer.de/smv/publications/download/virtualisation-sim-card-final.pdf, (Dec. 15, 2014), XP055158722, 101 pages.

Office Action dated May 25, 2017, issued in Chinese Patent Application No. 201180076162.8, 3 pages.

* cited by examiner

Receiving request 601

↓

Generating virtual SIM 602

↓

Allocating storage 603

↓

Send virtual SIM 604

Fig.6

VIRTUAL SIM CARD CLOUD PLATFORM

CROSS REFERENCE TO RELATED APPLICATION(S)

This application is a 35 U.S.C. § 371 National Phase Entry Application from PCT/CN2011/085027, filed Dec. 30, 2011, designating the United States, the disclosure of which is incorporated herein in its entirety by reference.

TECHNICAL FIELD

The present invention relates to a virtual SIM (Subscriber Identity Module) card platform for use in a so-called computing "cloud".

BACKGROUND

Mobile broadband networks are developing rapidly, for example with the introduction of $3^{rd}$ generation and $4^{th}$ generation wireless standards (3G,4G), and this means higher and higher speed wireless connections allowing for more complex applications. At the same time devices such as "smartphones" offer more advanced computing abilities and connectivity, and run complete operating systems with advanced hardware, such as dual-core processors, for example based on ARM or Nvidia. (The term "smartphone" generally refers to a device that combines the functions of a mobile telephone and a personal digital assistant (PDA) or notebook.)

A "Subscriber Identity Module" is used to identify the user of a mobile device (through a PIN entry mechanism), and to authenticate the user to a mobile network operator so that the network operator can authorise the user to make and receive calls using the mobile device. (In fact the SIM identifies the subscriber associated with the mobile device, that is the person or organisation that has a contract with an operator relating to the mobile device; the user of the device may be different from the subscriber—for example, where the subscriber is an organisation the user will typically be an employee of the subscriber, or where the subscriber is a person they may permit other family members to use the mobile device. For simplicity this application will assume that the user of the mobile device is also the subscriber, but the invention described herein may also be applied where the subscriber and user are different from one another.)

The SIM associated with a mobile device contains information about the user of the mobile device, including for example identification information such as the user's mobile number and network access credentials (key and key ID), and saved contact details (eg telephone number(s) or e-mail address(es)) for people with whom the user has communicated. In addition, a SIM contains encryption information that enables the mobile device to encrypt speech or data being sent from the mobile device, and to decrypt received speech or data. Currently the personal identity information for a smartphone is held on a SIM Card (Subscriber Identity Module) card in the smartphone, or on a USIM (Universal Subscriber Identity Module) card in the smartphone. (In 3G networks a SIM or USIM may be an application running on a Universal Integrated Circuit Card (UICC).) A SIM card, USIM card or UICC is a secured microprocessor chip with protected persistent storage.

Existing solutions have a number of problems, for example including the following:
1. SIM card memory is very limited, usually at most about 1 MB, which places a limit on how much user data and personal information data can be saved.
2. Security issue—when losing a mobile telephone, people have to buy a new SIM card and, and are unable to recover the information contained on the SIM card of the lost mobile telephone (which is usually very useful and/or private information).
3. Currently there exist SIM cards (reported from China) whose content can easy be copied.
4. User data on the SIM card, albeit protected by a PIN, is poorly protected on a smartphone against eavesdropping applications since the card interface as soon as the interface is open by a successful PIN verification is open for anybody to use. That is, a conventional SIM card lacks user access control.

For the sake of simplicity we have described these problems only in connection with SIM cards. However, all of what is said equally applies to USIM cards as well, or to an R-UIM card as used in the CDMA system. The term "SIM" as used herein is intended to cover USIM as well as SIM. The term "SIM card" as used herein is intended to cover a USIM card as well as a SIM card, and also to cover a UICC running a SIM or USIM application or a CDMA R-UIM application.

Regarding 1) we note that already today people hardly use the SIM card to store user data such as contact phone number (i.e. phone book) and/or dialled phone number history data. Instead people use storage on the mobile phone, and use a synchronization solution to synchronise contacts. This trend erodes the value of the SIM to the network operator.

There are proposed solutions for exporting UICC services from one phone to another like, for example, standardized in the Bluetooth SIM access profile (available at: https://www.bluetooth.org/Technical/Specifications/adopted.htm). The remote provisioning of UICC has been studied by the GSMA task force. For example a proposal how to move access credentials into a UICC is given by M. Walker in "Embedded SIMs and M2M Communications", Proceedings of ETSI Security Workshop, 20 Jan. 2011 (also available at: http://docbox.etsi.org/Workshop/2011/201101SECURITY WORKSHOP/S4 MOBIILE WIRE LESS SECURITY/WALKER EmbeddedSIMs.pdf addresses). These solutions are incomplete as they do not consider the creation and secure provisioning of the SIM and the needed components and keys, but focus on the remote access and security aspects thereof.

SUMMARY

A first aspect of the present invention provides a method of obtaining a virtual SIM for a mobile device. The method comprises authenticating at a mobile device, using a TTA (Terminal Trust Anchor) associated with the mobile device, a request for a virtual SIM for the mobile device. The authenticated request is then sent from the mobile device to an NRS (number registration service) application. The mobile device receives virtual SIM information, which identifies a PCSS (Private Cloud Storage Service) application in a computing environment that provides a virtual SIM for the mobile device.

One example of a computing environment suitable for use with the invention is a computing "cloud". So-called "Cloud platforms" are also developing rapidly. Cloud Computing is described at, for example: http://en.wilcipedia.org/wiki/Cloud_computing) and provides an abstraction of unlimited amount of networking, computing and storage resources for clients. The abstraction is achieved by virtualization of the infrastructure, platform and software in data centres. A cloud platform can satisfy all kinds of business applications, such as a private cloud application (or app) or public cloud app, can contain mass users, and give good performance and economical use of hardware resources.

The present invention proposes using a "virtual SIM", which executes on an application in a computing environment such as a computing cloud. This will be referred to as a "cloud SIM", but this term does not indicate that the invention is limited to a computing cloud. This allows, for example, a user to have a much greater memory than provided on current SIM cards, and also allows the size of memory provided on a SIM card in the mobile device to be reduced. Data are stored in storage created in a computing cloud by the PCSS application. The PCSS application saves the personal number of the mobile device and SIM security information, and provides interfaces to allow a user of the mobile device make calls and access other functions. The PCSS application also provides storage for all data that would be customarily stored on a conventional SIM card. The cloud SIM can therefore provide the user of the mobile device with all features that would be provided by a conventional SIM card, such as storage of contact details, access to services (such as an SMS service), and dialling records. Data stored in the cloud SIM is kept confidential to the user of the mobile device and the network operator, and a secure tunnel may be set up between the mobile device and the cloud to allow data to be transferred securely between the mobile device and the cloud or vice versa. Such secure tunnels can be realized, for example, through TLS/SSL or IPsec technology.

One problem to be addressed in implementing a cloud SIM is to provide the required trust, for example to enable the PCSS to satisfy itself that a request for a cloud SIM has come from a trusted device. The present invention addresses this by use of a TTA in, or associated with, the mobile device to provide a trust anchor. The TTA is typically installed in the mobile device by the manufacturer of the mobile device during the manufacturing process, and the presence of the TTA ensures that the mobile device contains an element that can be trusted. Thus, a network operator knows from the fact that the TTA has authenticated the request for a virtual SIM that the request comes from a device that is secure, and can be assured that the mobile device will securely hold any secrets (such as passwords or cellular network access keys) that are required to allow access to the operator's network.

Furthermore, the TTA provides the SIM anchor (the "SIM anchor" is that part of the SIM that needs to be implemented on the mobile device), and binds the cloud SIM into the mobile device's hardware.

The process of sending the request for the virtual SIM may be carried out by a CP (Client Package) application in the mobile device The method may further comprise verifying, at the mobile device, the received virtual SIM information.

Verifying the received virtual SIM information may comprise comparing a token received with the virtual SIM information with a token received from the NRS application and/or verifying that the received virtual SIM information includes information derived from TTA-authenticated information included in the request sent to the NRS application.

The method may further comprise caching the virtual SIM information at the mobile device.

Authenticating the request for a virtual SIM for the mobile device may comprise the TTA authenticating a token for inclusion in the request.

A second aspect of the present invention provides a method of generating a virtual SIM for a mobile device. The method comprises receiving, at an application in a computing environment, a request for a virtual SIM for a mobile device, the request including information identifying a TTA associated with the mobile device. The application generates virtual SIM information for the mobile device, and allocates storage space for the mobile device in the computing environment. The application then sends the virtual SIM information to the mobile device. This aspect of the invention relates to the generation of the virtual SIM by the PCSS application.

Generating virtual SIM information for the mobile device may comprise generating a mobile number for the mobile device. (The term "generating" is intended to cover a case where pre-calculated data are combined to obtain the virtual SIM information, as well as a case where the virtual SIM information is calculated from scratch.)

Sending the virtual SIM information to the mobile device may include sending a token to the mobile device, the token being, or being derived from, a token previously sent to the mobile device and/or information identifying the TTA.

A third aspect of the invention provides a mobile device configured to execute a client application for obtaining a virtual SIM for the mobile device, the mobile device comprising a processor and memory storing programming instructions that, when executed by the processor, establish the application. The application comprises a first interface for sending a request for a virtual SIM for the mobile device to an NRS application, the request being authenticated by a TTA associated with the mobile device. The application also has a second interface for receiving virtual SIM information which identifies a PCSS (private cloud storage service) application in a virtualised computing environment that provides a cloud SIM for the mobile device, and a module for verifying the received virtual SIM information.

The module for verifying the received virtual SIM information may be adapted to compare a token received with the virtual SIM information with a token received from the NRS application and/or to verify that the received virtual SIM information includes information derived from TTA-authenticated information included in the request sent to the NRS application.

The first interface may be the second interface.

The application may further comprises a cache module

The mobile device may further comprise a TTA.

A fourth aspect of the present invention provides a telecommunications network entity configured to execute an application for generating a virtual SIM for a mobile device in a computing environment, the network entity comprising a processor and memory storing programming instructions that, when executed by the processor, establish the application. The application comprises: a virtual SIM card generation module for generating virtual SIM information for the mobile device in response to the request for a virtual SIM for the mobile device, and a cloud SIM module for allocating storage space for the mobile device. It also comprises an interface for sending the virtual SIM information to the mobile device.

The virtual SIM card generation module may be adapted to verify security information included in the request for a virtual SIM for the mobile device before generating the virtual SIM information for the mobile device.

A fifth aspect of the invention provides a method of processing a request for a virtual SIM for a mobile device. The method comprises receiving, at an application in a computing environment, a request for a virtual SIM for a mobile device. The request includes information verified by a TTA of the mobile device. The method further includes verifying the request at the application, and generating a mobile number for the device. The request and information identifying the TTA of the mobile device are forwarded to a PCSS application.

The information identifying the TTA of the mobile device may comprise the information verified by a TTA received in the request for the virtual SIM or information derived therefrom.

The method may comprise selecting a network operator application based on information in the request identifying a preferred network operator, and forwarding the request to the selected network operator application.

The method may comprise, before receiving the request for a virtual SIM for the mobile device, generating a client application for the mobile device in response to a request from the mobile device.

A fifth aspect of the invention provides a telecommunications network entity configured to execute an application for processing a request for a virtual SIM for a mobile device in a computing environment. The network entity comprises a processor and memory storing programming instructions that, when executed by the processor, establish the application. The application comprises a first interface for receiving a request for a virtual SIM for a mobile device, the request including information verified by a TTA of the mobile device; a TTA authentication module for verifying the request; a module for generating a mobile number for the mobile device; and a second interface for forwarding to a PCSS application the request and information identifying the TTA of the mobile device.

The first interface and the second interface may be different interfaces.

The application may further comprise a client package (CP) generation module for generating a client application for the mobile device in response to a request from the mobile device.

The application may further comprise one or more network operator modules for generating network access data in response to the request for a virtual SIM for the mobile device.

The first interface may be adapted to forward the request for a virtual SIM for the mobile device to a selected one of the network operator modules based on information in the request identifying a preferred network operator.

A sixth aspect of the invention provides a computer-readable medium containing instructions that, when executed by a processor, cause the processor to carry out a method of the first, third or fifth aspect.

A seventh aspect of the invention provides a computer program for causing a processor to carry out a method of the first, third or fifth aspect.

In any aspect or embodiment of the invention, the computing may be a virtualised computing environment, although the invention is not limited to this.

It will be understood from the above that the invention makes use of an NRS application/module and a PCSS application/module. The NRS application/module may be separate from the PCSS application/module, or the NRS application/module may be combined with the PCSS application/module as a combined NRS/PCSS application/module. Accordingly, the term NRS application/module should, unless the context clearly indicates otherwise, be understood to cover either an NRS application/module or a combined NRS/PCSS application/module, and the term PCSS application/module should, unless the context clearly indicates otherwise, be understood to cover either a PCSS application/module or a combined NRS/PCSS application/module.

BRIEF DESCRIPTION OF THE DRAWINGS

Preferred embodiments of the present invention will be described by way of example with reference to the accompanying figures in which:

FIG. 6 is a block flow diagram illustrating a method according to another embodiment of the invention;

DETAILED DESCRIPTION

Figure 1:
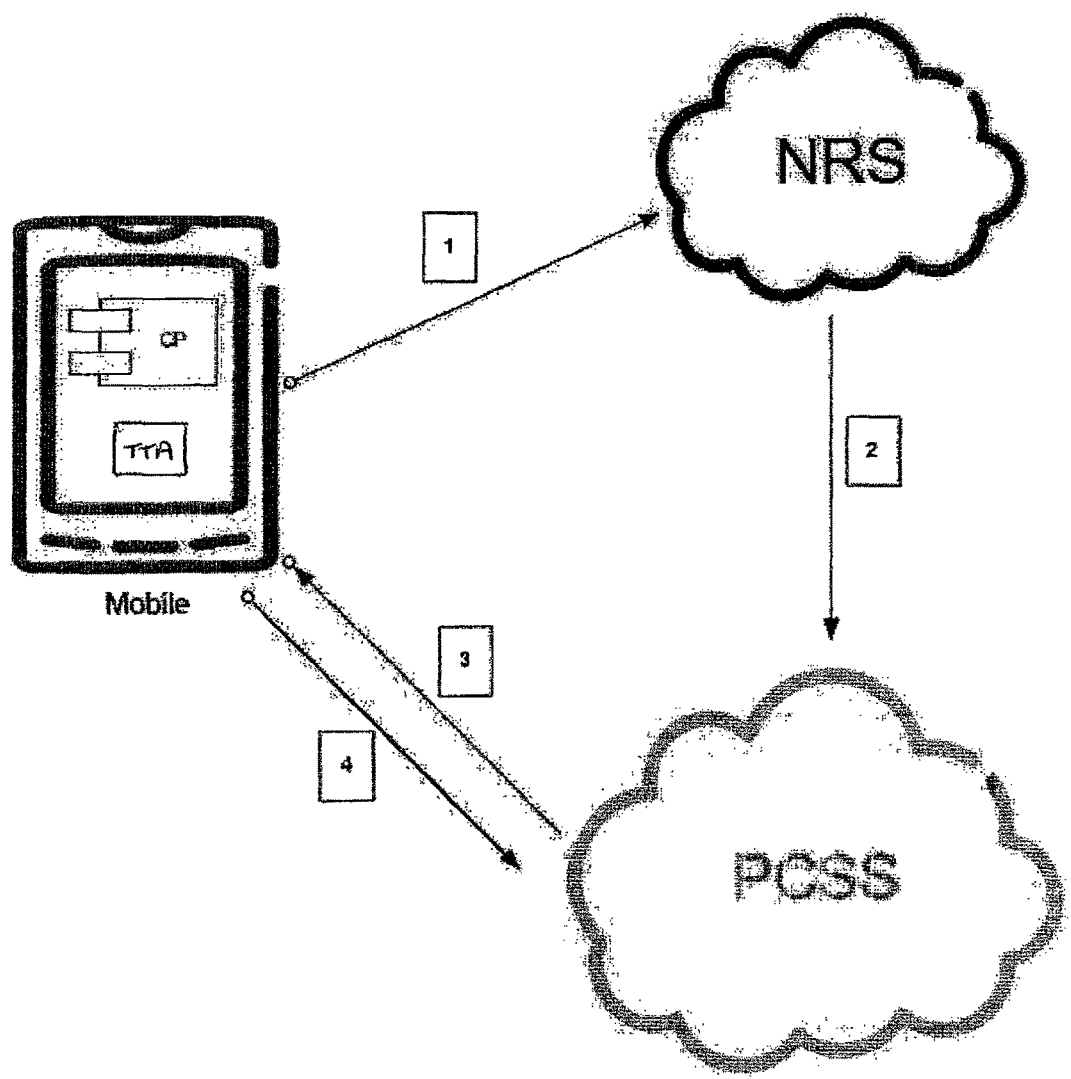
FIG. 1 is a schematic illustration of a cloud platform working process.

FIG. 1: is a block schematic diagram of the principal features of a generating a cloud SIM in a computing environment according to an embodiment of the present invention. The invention will be described with reference to examples in which the computing environment is virtualised computing environment, and in particular is a "cloud" platform so that the virtual SIM is a "cloud SIM", but the invention is not limited to this. Also, as explained above, the invention will be described with reference to examples in which the user of the mobile device is also the subscriber (ie has a contract with an operator relating to the mobile device), but the invention may be applied in cases where the user and the subscriber are different entities.

There are four main applications that co-operate to provide mobile number registration, generation of a "cloud SIM", that is generation of a virtual SIM card in a computing cloud or other virtualised computing environment, and allow use of the mobile device. These are a Client Package (CP), a Terminal Trust Anchor (TTA), a Number Registration Service (NRS) and a Private Cloud Storage Service (PCSS). These function as follows:

Client Package (CP): this is embedded in the mobile device, which may be a mobile telephone as shown in FIG. 1, for example a smartphone, and is able to connect directly to the NRS or PCSS, for example via a WLAN (wireless local area network). Once the virtual SIM card has been generated and installed and authenticated in the mobile device, the CP can communicate with the PCSS to allow the mobile device to make telephone calls and access other services.

Terminal Trust Anchor (TTA): this is embedded in the mobile, and provides a means to securely authenticate a request for a virtual SIM (where "securely" indicates that the authentication can be trusted by the PCSS). It also acts as the SIM anchor (that part of the SIM that needs to be implemented on the mobile device), and binds the virtual SIM into the hardware of the mobile device.

The TTA is an entity that is trusted to hold secret data (keys, information, etc) and is trusted to execute a given piece of software in an immutable manor. A TTA can be realised in many ways. For example, the TTA may be implemented on a chip designed to handle security functions—many chips of this type are known. Alternatively, if the mobile device has a TPM (a Trusted Platform Module—a security component that can be used to secure the boot process of a device so that only trusted software can be launched), the TPM can be used, in combination with a secure operating system such as SELinux, to create an isolated execution environment that constitutes a TTA. As a further example the TPM may, in combination with a hypervisor such as the Xen hypervisor, can start a virtual machine with a small operating system that runs isolated from other software and thus can be trusted to host the TTA.

The TTA is shown as being separate from the CP in FIG. 1, for clarity. However, the TTA may alternatively be embedded in the CP while still being a separate logical entity from the CP.

Number Registration Service (NRS): this provides the interfaces for number registration, and generates a mobile number for the mobile device.

Private Cloud Storage Service (PCSS): this saves the mobile number and SIM security information in a computing cloud or other virtualised computing environment, and provide interfaces and allows a user of the mobile device make a telephone call and use other services.

The NRS and PCSS are nodes that entirely or partly belong to the mobile network architecture. The NRS is public (i.e. outside an MNO's network) available interfaces. The PCSS operates entirely inside an MNO's network but could be shared by several MNO's. The PCSS is able to communicate with the HSS (Home Subscriber Server)/AuC (Authentication Centre) of the MNO in order to provide/synchronize subscriber data and access credentials (for the AuC).

The method of the invention involves the following principal processes:

Process 0 (not shown in FIG. 1): The manufacturer of the mobile device preinstalls the CP in the mobile device, as part of the manufacturing process. Alternatively if the CP is not pre-installed in the mobile device, the user (here assumed to be the subscriber) of the mobile device may put his device in a mode which indicates that the subscriber wants to apply for a virtual SIM. Using low level signalling the mobile device is allowed authenticated access to the network of an operator associated with the mobile device (such as an mobile network operator associated with the merchant who sold the mobile device) using the credentials in the TTA in the mobile device. The mobile device may be identified by, for example, its IMEI (International Mobile Equipment Identity) number, and this identity may be used to select the correct network operator even if the network has no knowledge of a subscriber associated with the mobile device. This authentication will give the mobile device limited access to a provider service in the NRS, which will install into the mobile device a CP with void virtual SIM association parameters.

The authentication at this stage may be based on other techniques than standard 3GPP AKA. For example, a public mobile number for a mobile service provider may be used (a public mobile number is similar to an emergency number but is here used for a different, specific purpose). As a further alternative one could also use a Public Key Infrastructure based solution, or the mobile device could borrow an SIM remotely via local connectivity, e.g. using a Bluetooth SIM access profile.

It should be noted that, in process 0, one can also use an MCIM solution as described as alternative 1 in 3GPP Technical Report 33.812 to setup the initial connectivity. The approach described above is based more closely on a possibility in the WiMAX mobile network system.

Process 1: The subscriber behind the mobile device starts the CP and enters his/her identification credentials. The CP will then connect to the NRS, and sends a request for a cloud SIM for the mobile device to the NRS. This request may also be considered as a registration request, as the mobile device is not currently registered with a mobile network operator. The request sent by the CP includes information identifying the mobile device such as an address of the mobile device (for example its MAC-Address), information identifying the subscriber (such as their identification credentials), and information that shows that the TTA of the mobile device has authenticated the request for a cloud SIM, such as a token authenticated by the TTA and preferably also by the CP. Having the CP authenticate the token as well as the TTA shows that the token originates from the CP on the mobile device with the correct TTA, and not from a "rogue" CP.

One way for the TTA to authenticate the request for the cloud SIM is for the CP to send the request to the TTA for authentication, before the CP sends the request to the NRS. The CP may also send the TTA information that identifies the CP (such as the version number of the CP or the ID number of the CP). The TTA processes the data that it receives from the CP and returns a response to the CP—for example the TTA may digitally "sign" the data that it receives and return the signed data to the CP. This digitally signed data constitutes a "token" that indicates that the request for a cloud SIM has been authenticated by the TTA, and the CP includes this token in the request sent to the NRS. (If the data signed by the TTA includes information identifying the CP, the token also identifies the CP.)

As noted above, it is preferable that the token is also authenticated by the CP, as well as by the TTA. One way to do this is for the CP to digitally "sign" some or all of the data that it sends to the TTA for the TTA to sign. This allows the request sent by the CP to include data that is digitally "signed" by the CP and by the TTA, or to include data that is digitally "signed" by the CP and data that is digitally "signed" by the TTA.

The TTA may digitally "sign" the data (or otherwise generate a token from the data that it receives from the CP) in any suitable way, and the invention is not limited to specific method of generating the token.

The request sent to the NRS may optionally be encrypted for privacy. This may easily be done using public key cryptography, and encrypting the request using the public key(s) of the NRS to which the request is being sent.

Process 2: Every telecommunications operator has their own cloud application (or virtualised application) in the NRS. This cloud application allows a telecommunications operator to check a new registration request—that is, to check that the request comes from a trusted mobile device (ie, from a device with a proper TTA), and from a legitimate subscriber (for example a subscriber who has purchased the mobile device, or a subscriber having an existing subscription with the operator), and send confirmation to the mobile device them after processing the registration request. That the request comes from a legitimate subscriber may be checked the "information credentials" entered by the user in process 1 and included in the request sent by the CP.

When the request for a cloud SIM for a mobile device is received, the NRS—or, to be more specific, one operator's cloud application in the NRS—will check whether the request comes from a trusted mobile device, eg from a mobile device with a TTA that is trusted by the NRS (or by the operator). (If a request is found to come from an untrusted mobile device the NRS will decline the request.) If a registration request is found to come from a trusted mobile device, the NRS—or one operator's cloud application in the NRS—will register the mobile device with that operator. The operator's cloud application will store in its database information such as the mobile number of the subscriber and/or the subscriber identity (IMSI) (the generation of which is described below), other device information, subscriber information, CP information such as version and/or serial number etc.

The NRS—or the chosen operator's cloud application in the NRS—will then generate an IMSI and mobile number for the subscriber, and will also generate network access credentials for the device. These are authentication/access data that will, once the registration process is complete, allow the mobile device to login to the PCSS, such as a username and password/security key. Thus, while the subscriber is using the mobile device, the mobile device is able to communicate with the PCSS, for example to store data in the PCSS or to retrieve stored data from the PCSS. The subscriber need not be aware of the communications between the mobile device and the PCSS—if the subscriber asks for, for example, the contact details for someone they wish to call, the CP in the mobile may handle the process of retrieving this information from the PCSS without the need for further input from the subscriber.

The NRS also includes a module for generating security tokens, such as a TTA. This may be linked with the TTA in the CP—for example one TTA may be embedded in the mobile device, in the NRS and the PCSS to be described below. When the NRS receives the request for a cloud SIM from the mobile device, this module generates two security tokens, which will be referred to as "token 1" and "token 2" for convenience. Token 1 is used to encrypt data for sending to the PCSS from NRS. The use of token 2 is to allow the CP of the mobile device to authenticate that the registration process has been completed correctly, as described below.

Figure 2:
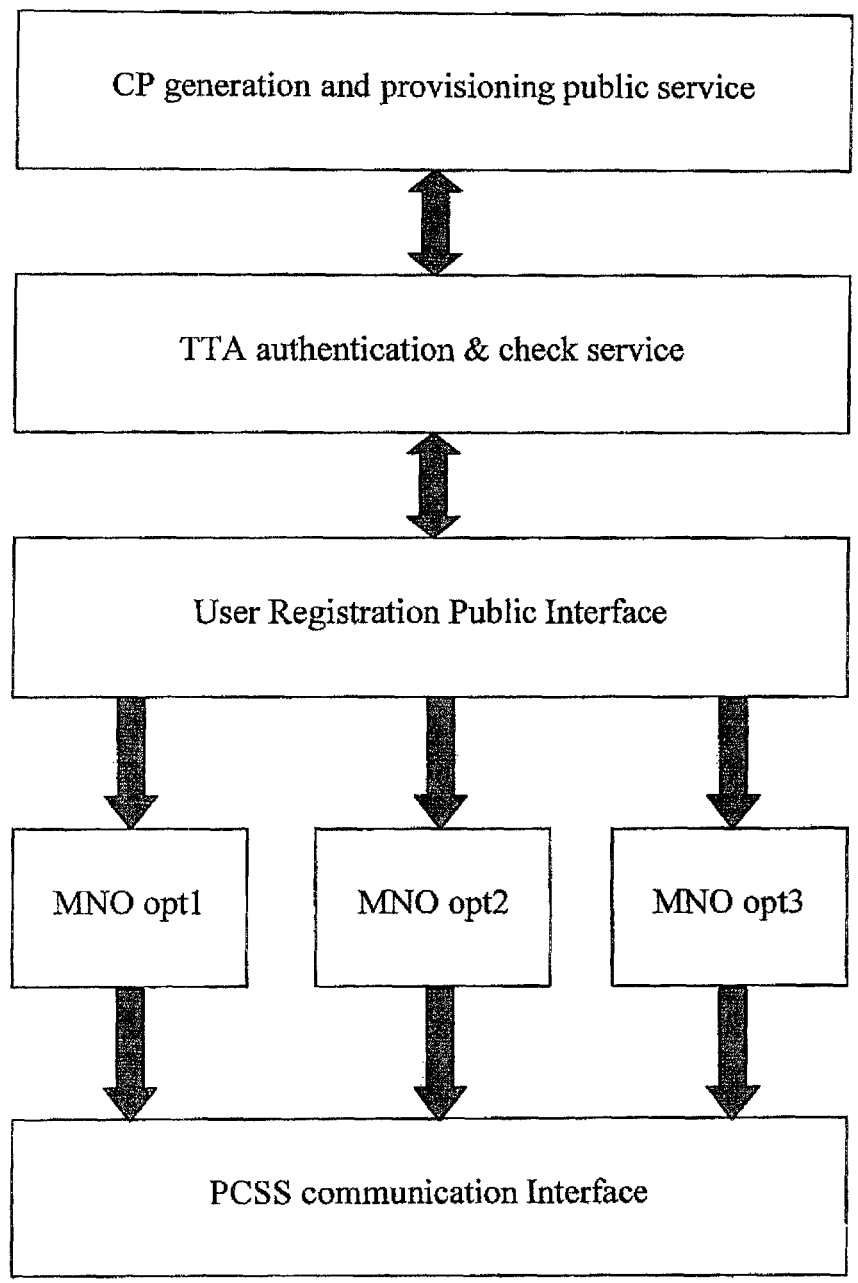
FIG. 2 is a schematic illustration of the structure of an NRS application.

The NRS sends acknowledgement of receipt of the registration request to the CP (not shown in FIG. 2). The acknowledgement includes "token 2", one of the security tokens generated by the NRS.

Finally, the NRS will send to the PCSS identification of the mobile device (such as its IMEI and MAC address), the IMSI and the mobile number that the NRS has generated for the subscriber, and the authentication/access data that the NRS has generated. The NRS will also send to the PCSS the second token, token 2, that it has generated. Data sent to the PCSS from the NRS may be encrypted using the first token, token 1, that the NRS has generated.

Process 3: The PCSS receives the data sent by the NRS and, if the data were sent encrypted, decrypts the received data. (If communications from the NRS are encrypted, the PCSS will be provided with a suitable module to decrypt the received communications, for example a TTA module that is linked to the TTA module in the NRS so that the PCSS is aware that the communication from the NRS is encrypted with token 1.) When PCSS receives the identification of the mobile device, the mobile number and the network access credentials from the NRS it will, after validating the request, register the mobile number of the mobile device and the network access credentials in the PCSS cloud platform. Validating the request may for example comprise checking that the information received from the NRS shows that the request originated from a mobile device with a TTA trusted by the NRS, namely that the information received from the NRS includes the TTA-authenticated security token (or a token derived therefrom).

The PCSS will then generate cloud SIM information for the mobile device, and will allocate storage in the PCSS cloud for the subscriber. The cloud SIM information may for example include cloud application information for the mobile device such as a list of contacts, an SMS box and/or MMS box (that is, an application to archive all text messages (SMS), and/or multimedia messages (MMS) and/or phone calls) etc, and could possibly even include one or more applications provided by the subscriber.

The PCSS then sends, to the CP, the mobile number and the network access credentials for the mobile device that it received from the NRS. The PCSS also sends to the CP the token 2 (the one of the pair of security tokens generated by the NRS that the NRS has already sent to the CP and also sent to the PCSS).

Process 4: When CP receives the "token 2" from the PCSS, it will verify that this is the same as the "token 2" that the CP has previously received from the NRS, thus assuring the CP that the received mobile number and network access credentials come from a source that is trusted by the NRS and thus is trusted by the mobile network operator. Provided that the verification is satisfactory, the subscriber can then use the mobile device, for example to make telephone calls and/or access other services, just as if the mobile device were provided with a conventional SIM card. The CP can also use the network access credentials to access the PCSS to call all kinds of application services that would be supported by a conventional SIM card, e.g. synchronise a contact list, a SM (short messaging) service, access dialling records etc.

For example, if the subscriber wanted to send a text message to a person whose contact details were stored in the cloud SIM, the subscriber would enter the text message into the mobile device in the usual way, and would then select the stored contact to whom the message is to be sent. The CP will then, using the stored network access credentials, communicate with the PCSS to retrieve the mobile number (or other address information) stored in the PCSS for the contact to whom the message is to be sent (although some information that is frequently required may be stored in the mobile device, in a cache in the CP as described below). The text message can then be sent to the mobile number (or other address information) retrieved from the PCSS.

For security, it is desirable that communications between the CP and the PCSS are encrypted. In principle, the CP and PCSS could use the "token 2" to secure communications between themselves, as they are both in possession of token 2. For improved security, however, it is preferable to use a different token to secure communications between the CP and the PCSS. The PCSS therefore preferably generates a third token, "token 3", and sends this to the CP. The PCSS may generate token 3 when it generates the cloud SIM information, and send token 3 to the CP in process 3. Alternatively, once the CP has verified the information it receives from the PCSS in process 3 it may send one message to the PCSS that is secured with token 2, and the PCSS may then generate token 3 and send it to the CP for use in subsequent communication.

It should be noted that the method described above is only one embodiment of the invention, and that variations are possible. For example, instead of the PCSS sending "token 2" to the CP in process 3, the PCSS may apply a known modification to token 2 and send the result of the modification to the CP. The CP can then verify in process 4 that the token it has received from the CP is the result of applying the known modification to the token 2 that the CP received from the NRS in process 2.

It should be noted that, to facilitate access authentication based on TTA public key credentials, one needs to change the AKA (Authentication and Key Agreement) security procedure. Since the TTA is not MNO specific, the TTA cannot verify that it is communicating with the "correct" MNO (for example an MNO associated with the merchant who sold the mobile device). One way of overcoming this would be to provide the TTA with means to verify that it is receiving data via an entity that has a trust relation to the entity (here assumed to be the manufacturer of the phone) that installed the TTA. In any case there are several ways to introduces changes to the existing AKA procedure to add the needed functionality. A simple one would be to only augment the return response to become the secret key encrypted challenge (i.e signature), along with a chain of certificates needed to very the response.

FIG. 2 is a block schematic diagram of one embodiment of the structure of the NRS application/module. The NRS of FIG. 2 actually is an enterprise cloud, having 4, possibly 5, main applications or modules.

The NRS of FIG. 2 is optionally provided with a "CP generating and provisioning public service" application/module. This may be used, when a CP is not preinstalled in the mobile device, to carry out a provisioning process for example as described with reference to Process 0 above. That is, the "CP generating and provisioning public service" is able to install a CP with void cloud SIM association parameters into a mobile device that was not pre-installed with a CP. The "CP generating and provisioning public service" application uses a second module which provides services to authenticate the credential provided by the TTA of the mobile device in Process 0—namely the "TTA authentication and check service" module.

It should be noted that the "CP generating and provisioning public service" module could alternatively be implemented outside the NRS—but for simplicity we assume it here to be a part of the NRS. It should also be noted that the "CP generating and provisioning public service" application/module is not necessarily required to generate a CP that it provisions into a mobile device in Process 0. In principle, the "CP generating and provisioning public service" application/module could generate a CP when it is required to provision a CP into a mobile device. However, since CPs are essentially identical to one another it may be more efficient to generate the CP (or at least most of the code for the CP) beforehand—so that, when a mobile device requires provisioning with a CP, the "CP generating and provisioning public service" application/module can select an already-existing CP and provision this into the mobile device.

The "TTA authentication and check service" application/module serves to authenticate the credential provided by the TTA of the mobile device in any message received from the mobile device, such as the message sent by (the CP of) the mobile device in Process 1 (and the message sent by the mobile device in Process 0, if present). The TTA authentication and check service also generates token 1 and token 2 in process 2.

The NRS of FIG. 2 further has a "User Registration Public Interface" (RPI) module. This functions to:
a) receive the request for a cloud SIM from the CP of the mobile device for which the cloud SIM is requested;
b) use the TTA authentication & verification service to test if the mobile device which sent the request for a cloud SIM can be trusted;
c) parse and assign the request to a selected Telecommunications operator terminal or operator application, depending on information contained in the request from the mobile device (eg information identifying a preferred/required network operator).

The NRS of FIG. 2 further has one or more MNO applications/modules, or telecommunication operator cloud applications/modules. Every telecommunication operator can apply for their own MNO application/module in the cloud (or other virtualised computing environment), to allow the operator to make a transaction when a request for a cloud SIM is received. The MNO module performs the following functions:
a) it handles the request for a cloud SIM, by generating a mobile number for the mobile device, and generating authentication/access data that will allow the mobile device/subscriber to login to the PCSS;
b) Send the mobile number and authentication/access data to the PCSS communication interface module, preferably encrypted for security (eg by "wrapping" the mobile number and authentication/access data with an encryption algorithm).

The NRS of FIG. 2 further has a PCSS communication interface application/module. The PCSS communication interface will "unwrap" the mobile number and authentication/access data that it receives from the MNO application, re-encrypt the data with a security token that is also known to the PCSS, namely token 1 described above, and send it to the PCSS.

If the NRS handles the provisioning of the CP for the mobile device (at Process 0 of FIG. 1), this means that initially, before the CP is provided to the mobile device, the NRS communicates with an application/module in the TTA in the mobile device that the NRS uses to verify the TTA (for example by requiring test of ownership of a device secret and verifying the public key of this secret against a revocation service). It is possible that the mobile device and the NRS may use different software platforms, and the NRS may therefore be provided with a database of CPs so that it can select a CP that is appropriate to the mobile device. Every CP is identified by a unique serial number, so that the NRS can record which CP is provisioned into the mobile device.

Figure 3:
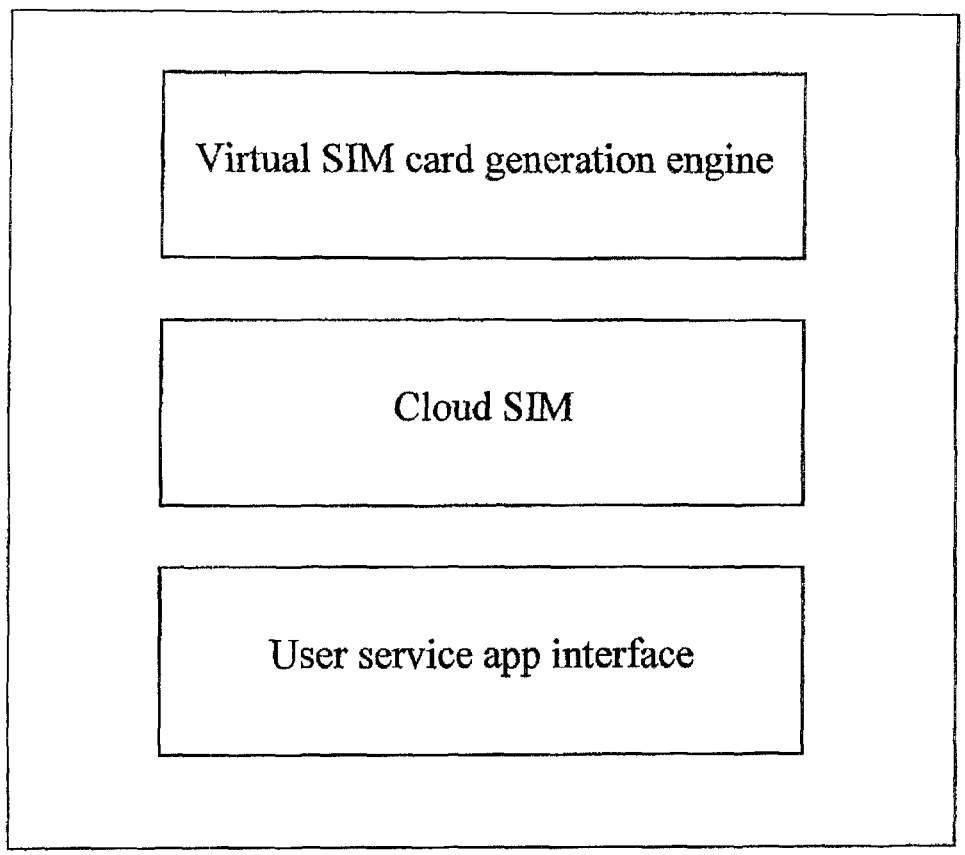
FIG. 3 is a schematic illustration of the structure of a PCSS application.

FIG. 3 is a schematic block diagram of the structure of the PCSS application/module according to one embodiment. The PCSS may be a user application that operates in a cloud or other virtualised computing environment. The PCSS of FIG. 3 has 3 principal applications/modules.

The PCSS of FIG. 3 has a Virtual SIM card generation application/module. This receives the data from the NRS (which data includes an address of the mobile device, the mobile number generated for the mobile device by the NRS, and the authentication/access data generated by the NRS). As explained above the PCSS communication interface of the NRS of FIG. 2 wraps the information with a security token, and the Virtual SIM card generation module is able to unwrap the received information with a decryption algorithm.

The Virtual SIM card generation module generates necessary SIM information for every request for a cloud SIM.

The PCSS of FIG. 3 further has a Cloud SIM application/module. This has the following functions:
a to allocate storage for every subscriber in the PCSS cloud, for example based on the subscriber's requirements or on the terms of the subscriber's subscription with the operator.
b to manage the subscriber's allocated storage in the PCSS cloud. For example it may decide to increase, or reduce the storage allocated to a particular subscriber if experience shows that the storage allocated to a subscriber to too small, or too large.

The PCSS of FIG. 3 further has a User service interface application/module. This has the following functions:
c to provide query service for user, for example to handle a request from the subscriber to download data to the mobile device, such as a request to download the subscriber's contact list or SMS history records etc
d to manage personal SIM card interface, for example to upload data from the mobile device to the PCSS such as, for example, SMS records
e to communicate with the CP.

In the above description, it has been assumed that the NRS application/module is separate from the PSCC application/module. The invention is not however limited to this, and it is alternatively possible for the NRS application/module and the PSCC application/module to be combined as a single application/module.

Such a combined NRS/PCSS application/module would operate as described above for the separate NRS application/module and PCSS application/module except that, rather than sending data from the NRS application/module to the PCSS application/module, data would be sent from one module of the combined NRS/PCSS application/module to another module of the combined NRS/PCSS application/module. As a result, there would be no need for "token 1" (used to secure communications between the NRS application/module and PCSS application/module) to be generated. Also, the combined PCSS/NRS application would send "token 2" to the CP twice—once when it receives the request from the CP as an acknowledgement of the request, and once when it sends the virtual SIM information to the CP.

The structure of a combined NRS/PCSS application/module would include all features of FIGS. 2 and 3, except that the "PCSS communication interface" of FIG. 2 would not be needed.

Figure 4:
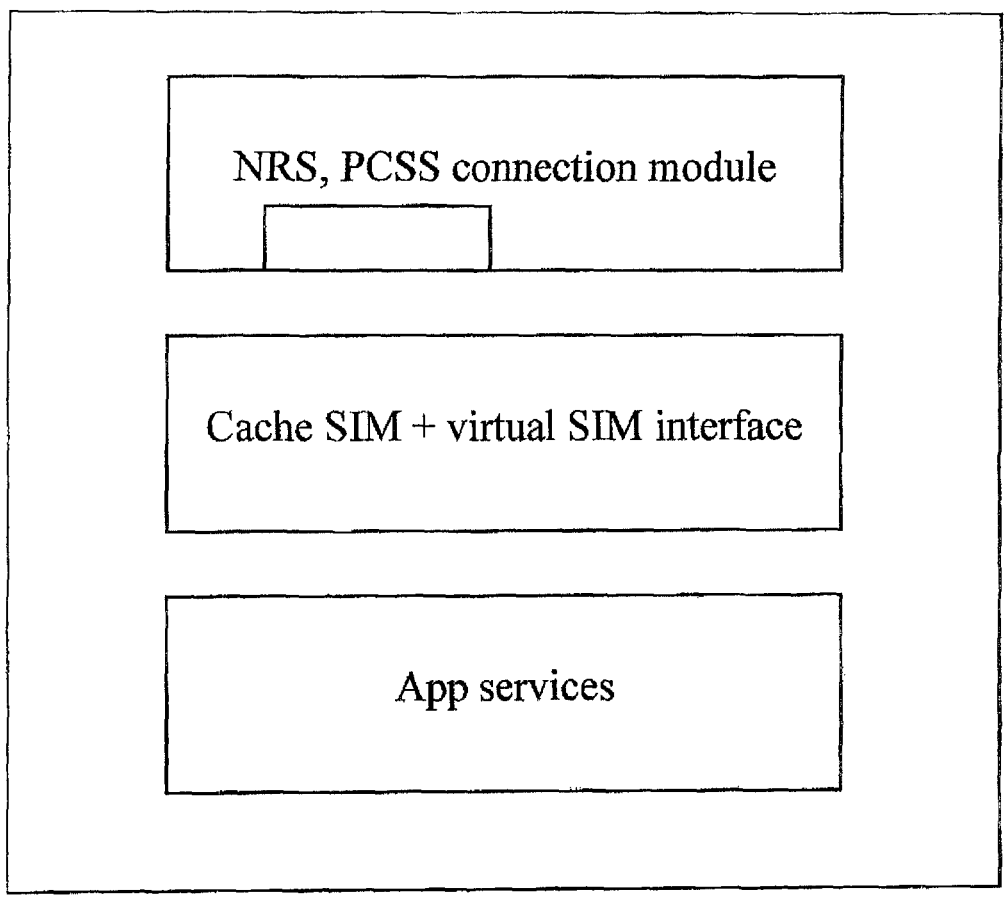
FIG. 4 is a schematic illustration of the structure of a CP application.

FIG. 4 is a schematic block diagram of the structure of the CP application/module according to one embodiment of the invention. The CP application is set up in the mobile device, and a telecommunications provider can configure their own settings.

The CP of FIG. 4 has a Connection Application/Module. This allows the CP to communicate with the NRS and PCSS. After startup of the mobile device, the Connection Module can build a connection to the NRS and/or PCSS automatically via WLAN without requiring the user of the mobile device to log-in.

The Connection Module of the CP sends the registration request to the NRS (Process 1), and receives the cloud SIM data from the PCSS (Process 3). The Connection Module of the CP can then communicate with the PCSS (Process 4).

The Connection Module of the CP is also able to validate the data received from the PCSS, as indicated by the inclusion of an authentication module in FIG. 4—although it should be noted that the Connection Module does not need to have a specific, separate authentication module provided that the Connection Module can validate the received data.

The CP of FIG. 4 further has a Cache SIM Application/Module. The Cache SIM Module is a combination of storage and a program for managing the storage, and is used to store data that is critical for accessing the PCSS. Thus, when the CP receives the network access credentials from the PCSS these are stored in the Cache SIM Module, and so can be easily retrieved by a mobile application running on the mobile device whenever the mobile application wishes to communicate with the PCSS. The Cache SIM Module may also store data that are frequently required to be retrieved. The Cache SIM Module preferably also allows the subscriber or the mobile device to automatically upload data from the Cache SIM Module to the PCSS—the Cache SIM Module has a limited memory and uploading of data from the Cache SIM Module to the PCSS is required to prevent over-writing of data in the Cache SIM Module.

The Cache SIM Module may also store other data that is frequently requested by the CP, so that it is more efficient to keep this data in the CP rather than have to retrieve it from the cloud SIM every time it is required.

The CP of FIG. 4 further has a Virtual SIM interface Application/Module. This is a program or module that handles communication with the cloud SIM.

The Cache SIM Module and the Virtual SIM interface Module may be combined as one module as shown in FIG. 3, or may be implemented as separate modules.

The CP of FIG. 4 further has an "App services" Application/Module. This can call the PCSS services and return the security data. (In addition to the cached access credentials other secure data are stored by the CP. For example, as trust has been bootstrapped via the TTA into the CP, the CP is able exchange data with the PCSS. Communication between the CP and the PCSS preferably goes via a protected tunnel whose security context (e.g. session keys and nonces) relate to the individual session. That latter is easy realised by involving, in the computation of the security context, the token material that CP and PCSS share—and to enable this the token material is stored in the CP.

The "App services" Application/Module can also read data stored in the Cache SIM Module, and provide other services toward outside (such as system lock if the subscriber reports they have lost their mobile device).

As noted, the CP may also include a TTA application/module (or the TTA may be separate from the CP).

The SIM functionality that must remain in the phone, i.e, the capability to perform an AKA procedure and connect to the network is very limited. Experiments show that data requirements for such basic functionality are as low as 8 Kbytes. Such functionality (to run AKA, PIN handling and data storage cache) can be implemented on a reduced size UICC, embedded UICC, or embedded in the mobile device, preferably in a secure isolated subsystem of the mobile device such as the Cache SIM module. This functionality is required to be retained in the mobile device at all times, as otherwise the mobile device may loose the ability to authenticate itself after a reboot—so if this data is stored in the Cache SIM module it should not be removed from the cache to make space for other data to be cached.

Figure 5:
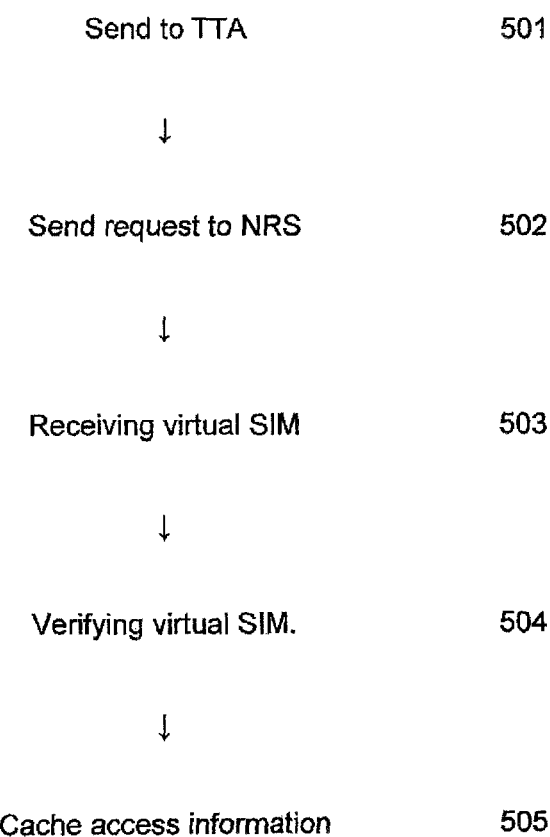
FIG. 5 is a block flow diagram illustrating a method according to one embodiment of the invention.

FIG. 5 is a block flow diagram showing the principal steps carried by a CP in a method of the invention. At step 501, the CP sends a request for a cloud SIM for a mobile device to a TTA for authentication. The TTA is associated with the mobile device, and for example is embedded in the mobile device.

The CP receives the authenticated request from the TTA (not shown), and then sends the authenticated request for a cloud SIM an NRS application (step 502).

Subsequently the CP receives cloud SIM information from the PCSS (step 503), and optionally verifies the received cloud SIM information (step 504). The CP also caches access information for the cloud SIM (step 505) (and may also cache other information that it expects will frequently require to be retrieved).

Figure 7:
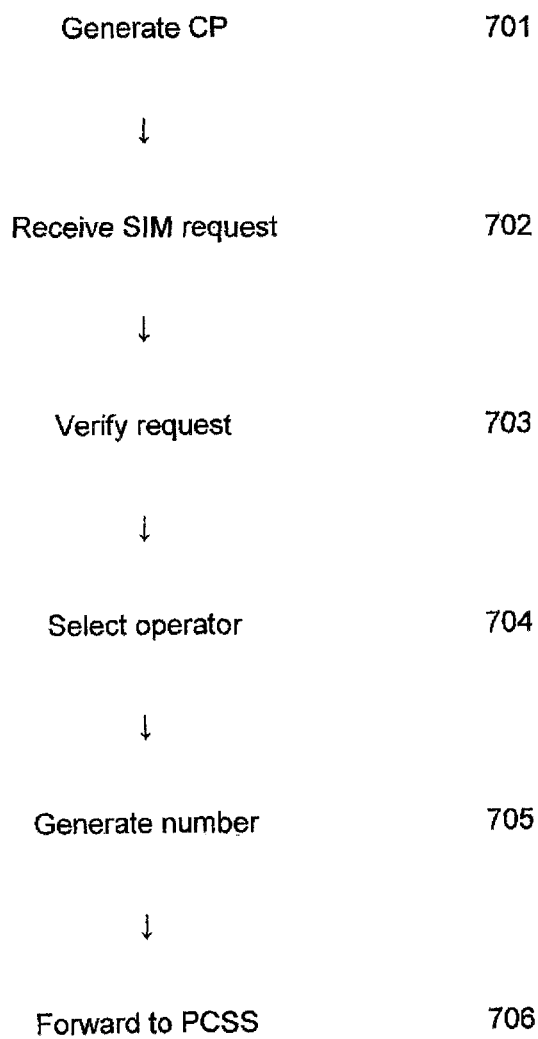
FIG. 7 is a block flow diagram illustrating a method according to another embodiment of the invention.

FIG. 7 is a block flow diagram showing the principal steps carried by an NRS application in a method of the invention.

Optionally, the NRS application may initially generate a client application for the mobile device in response to a request from the mobile device (step 701), if no client application is pre-provisioned in the mobile device.

At step 702 the NRS application receives a request for a cloud SIM for a mobile device. The request including information verified by a TTA of the mobile device. The NRS application verifies the request at step 703, and, if the verification is satisfactory, selects (step 704) a network operator for the mobile device (for example based on information in the request identifying a preferred network operator). The NRS application then generates a mobile number for the device (step 705).

The NRS application then forwards the request, and information identifying the TTA of the mobile device, and the generated mobile number to a PCSS application (step 706).

FIG. 6 is a block flow diagram showing the principal steps carried by a PCSS in a virtualised computing environment such as a computing cloud in a method of the invention.

At step 601 the PCSS receives, from an NRS, a request for a cloud SIM for a mobile device. The request is preferably encrypted and, if so, the PCSS decrypts the request. The request includes a mobile number generated by the NRS, and also includes information identifying a TTA associated with the mobile device.

The PCSS generates cloud SIM information for the mobile device (step 602) and allocates (step 603) storage space for the mobile device in the PCSS application in the cloud (or other virtualised computing environment). The PCSS then sends the cloud SIM information to the mobile device (step 604).

Figure 8:
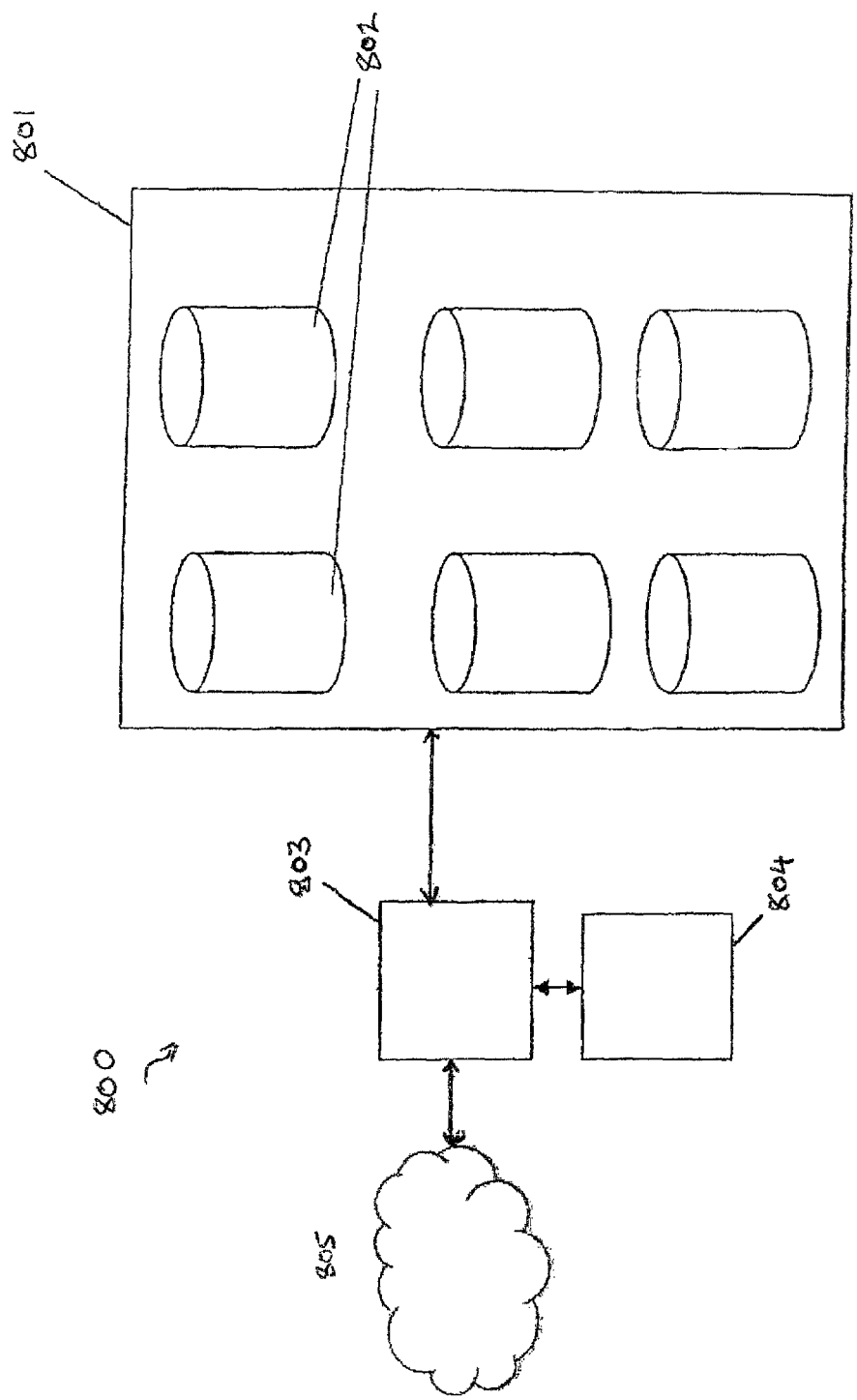
FIG. 8 is a schematic block diagram of a network entity according to an embodiment of the invention.

FIG. 8 is a schematic block diagram of a telecommunications network entity 1700 embodying the present invention. FIG. 8 shows an example where the telecommunications network entity 800 is a manager of a distributed computing environment 801 containing a plurality of processors 802. For example, the distributed computing environment 801 may be a computing cloud and the telecommunications network entity 800 may control what happens in virtualisation platforms in the cloud 801.

The telecommunications network entity 800 contains a processor 803 that operates according to instructions contained on a computer-readable medium 804 such as a magnetic disc or an optical disc.

The computer-readable medium 804 may for example cause the processor 803 to provide a PCSS application that operates as described above. The processor 803 may receive a request for a cloud SIM for a mobile device from an NRS (not shown) via a suitable access network 805 such as the internet. The computer-readable medium 804 may then cause the processor 803 to allocate the mobile device storage in the cloud 801, and generate cloud SIM information for the mobile device. The computer-readable medium 804 may then cause the processor 803 to send the cloud SIM information to the mobile device.

Figure 9:
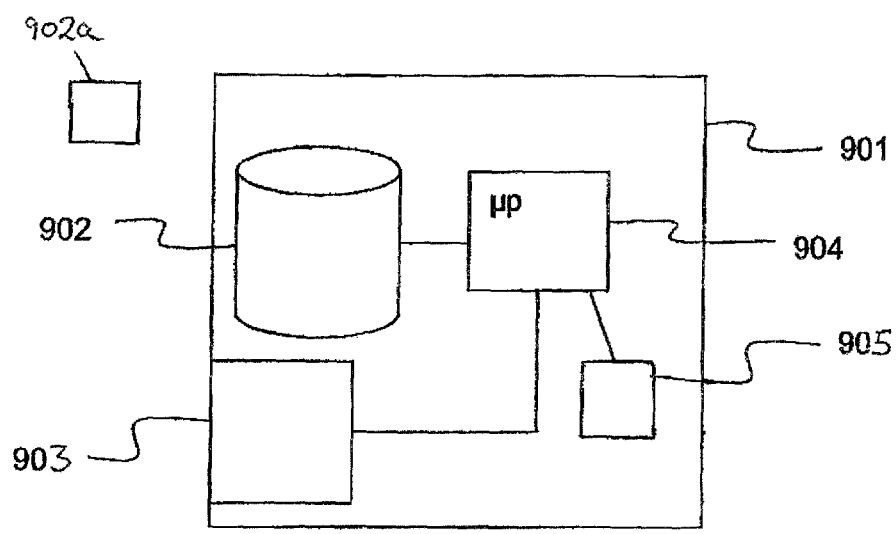
FIG. 9 is a schematic block diagram of a mobile device according to an embodiment of the invention.

FIG. 9 is a block diagram showing principal components of a mobile device 901 according to an embodiment of the invention. The mobile device has a wireless interface 903, a processor 904 and a memory 902. Other components such as a display and a data entry device such as a keyboard (or a component such as a touchscreen that acts as both a display and a data entry device) are omitted for clarity.

The mobile device contains stored programming instructions that, when executed by the processor 904, establish a client package application that operates as described above. The programming instructions may be stored in the memory 902, in a separate memory (not shown), or on an external computer-readable medium 902a such as a magnetic or optical disc.

The mobile device further comprises a TTA 905 that is associated with the mobile device, and that may be provided in the mobile device (as shown in FIG. 9).

The present invention provides several advantages, including the following:
1) It improve the possibilities for handling (e.g. secure storage) of personal information on SIM card—the use of a "cloud SIM" provides the user with greater storage and better processing capabilities than can be provided by a conventional SIM card;
2) It decreases the hardware demands on SIM/UICC part in the mobile device, since the residual SIM functions that remain in the mobile device are limited;
3) Increases the ability of an enterprise to manage the subscriber—for example, to respond quickly to open or close a subscriber's mobile functions—for example, if a subscriber should loose their mobile device the enterprise can quickly recover the cloud SIM information (such as SMS, dialling history etc) for the user;
4) It promotes applications and service extension.

It should be noted that the embodiments of the invention described above use access authentication that is not standard AKA (Authentication and Key Agreement) authentication. Such access methods are allowed in the WiMAX standard.

The invention claimed is:

1. A method in a mobile device for obtaining a virtual SIM (subscriber identity module) for the mobile device, the method comprising:
    sending, from a CP (client package) application in the mobile device to a TTA (terminal trust anchor) embedded in the mobile device, a first request for a virtual SIM for the mobile device;
    obtaining by the CP, from the TTA, an authentication response in response to the first request, the authentication response comprising TTA authentication information, wherein the TTA authentication information comprises a token provided by the TTA, the token comprising digitally signed data from the TTA;
    sending by the CP a second request to an NRS (number registration service) application, wherein the second request comprises the TTA authentication information and wherein the NRS application generates for the mobile device a mobile number, an international mobile subscriber identity (IMSI) number, and network access credentials; and
    receiving, by the CP of the mobile device, virtual SIM information, the virtual SIM information identifying a PCSS (private cloud storage service) application in a computing environment that provides the virtual SIM for the mobile device.

2. The method as claimed in claim 1, further comprising verifying, at the mobile device, the received virtual SIM information.

3. The method as claimed in claim 2, wherein verifying the received virtual SIM information comprises comparing a token received with the virtual SIM information with a token received from the NRS application.

4. The method as claimed in claim 1, further comprising caching access information for the virtual SIM at the mobile device.

5. A method of generating a virtual SIM (subscriber identity module) for a mobile device, the method comprising:
- receiving, at a PCSS (private cloud storage service) application in a computing environment that provides a virtual SIM for the mobile device, a request from a NRS (number registration service) application for the virtual SIM for the mobile device, the request including information identifying a TTA (terminal trust anchor) embedded in the mobile device, an international mobile subscriber identity (IMSI) number identifying the mobile device, network access credentials for the mobile device, and a mobile number for the mobile device;
- generating, by the PCSS application, virtual SIM information for the mobile device;
- allocating, by the PCSS application, storage space for the mobile device in the application in the computing environment;
- storing, by the PCSS application, the mobile number in the allocated storage space; and
- sending, by the PCSS application, the virtual SIM information, the mobile number, and the network access credentials to the mobile device, wherein sending the virtual SIM information to the mobile device includes sending a token to the mobile device, wherein the token comprises digitally signed data and is one of a token previously sent to the mobile device and a token derived from a token previously sent to the mobile device.

6. A mobile device configured to execute a client package (CP) application for obtaining a virtual SIM (subscriber identity module) for the mobile device, the mobile device comprising a processor, a TTA (terminal trust anchor), and memory storing programming instructions that, when executed by the processor, establish the CP application, which comprises:
- a module for:
  - sending, to the TTA, a first request for a virtual SIM for the mobile device, the TTA being associated with the mobile device, and
  - obtaining, from the TTA, an authentication response in response to the first request, the authentication response comprising TTA authentication information, wherein the TTA authentication information comprises a token provided by the TTA, the token comprising digitally signed data from the TTA;
- a first interface for sending a second request for a virtual SIM for the mobile device to an NRS (number registration service) application, wherein the second request comprises the TTA authentication information and wherein the NRS application generates for the mobile device a mobile number, an international mobile subscriber identity (IMSI) number, and network access credentials, and the request being authenticated by the TTA; and
- a second interface for receiving, at the mobile device, virtual SIM information which identifies a PCSS (private cloud storage service) application in a computing environment that provides the virtual SIM for the mobile device.

7. The mobile device as claimed in claim 6, and further comprising a module for verifying the received virtual SIM information.

8. The mobile device as claimed in claim 7, wherein the module is adapted to compare a token received with the virtual SIM information with a token received from the NRS application.

9. The mobile device as claimed in claim 6, wherein the first interface is the second interface.

10. The mobile device as claimed in claim 6, wherein the application further comprises a cache module.

11. A telecommunications network entity configured to execute a PCSS (private cloud storage service) application for generating a virtual SIM (subscriber identity module) for a mobile device in a computing environment, the network entity comprising a processor and memory storing programming instructions that, when executed by the processor, establish the PCSS application, which comprises:
- a virtual SIM card generation module for generating virtual SIM information for the mobile device in response to receiving a request from a NRS (number registration service) application for a virtual SIM for the mobile device, the request including information identifying a TTA (terminal trust anchor) embedded in the mobile device, an international mobile subscriber identity (IMSI) number identifying the mobile device, network access credentials for the mobile device, and a mobile number for the mobile device;
- a virtual SIM module for allocating storage space for the mobile device, wherein the mobile number is stored in the allocated storage space; and
- an interface for sending the virtual SIM information, the mobile number, and the network access credentials to the mobile device, wherein sending the virtual SIM information to the mobile device includes sending a token to the mobile device, wherein the token comprises digitally signed data and is one of a token previously sent to the mobile device and a token derived from a token previously sent to the mobile device.

12. The telecommunications network entity as claimed in claim 11, wherein the virtual SIM card generation module is adapted to verify security information included in the request for a virtual SIM for the mobile device before generating the virtual SIM information for the mobile device.

13. A method of processing a request for a virtual SIM for a mobile device, the method comprising:
- receiving, at a NRS (number registration service) application in a computing environment, a request for a virtual SIM for a mobile device, the request including information verified by a TTA (terminal trust anchor) embedded in the mobile device, wherein the information verified by the TTA comprises a token provided by the TTA, the token comprising digitally signed data by the TTA, wherein the virtual SIM is used to enable a user of the mobile device to make and receive calls;
- verifying, at the NRS application, the request;
- generating, by the NRS application, a mobile number for the device, an international mobile subscriber identity (IMSI) number for the device, and network access credentials for the device; and
- forwarding to a PCSS (private cloud storage service) application the request and information identifying the TTA embedded in the mobile device, wherein the PCSS application provides the virtual SIM for the mobile device.

14. The method as claimed in claim 13, wherein the information identifying the TTA of the mobile device comprises one of the information verified by a TTA received in the request for the virtual SIM and information derived from the information verified by a TTA received in the request for the virtual SIM.

15. The method as claimed in claim 13, further comprising selecting a network operator application based on information in the request identifying a preferred network operator, and forwarding the request to the selected network operator application.

16. The method as claimed in claim 13, further comprising, before receiving the request for a virtual SIM for the mobile device, provisioning a client application for the mobile device in response to a request from the mobile device.

17. A telecommunications network entity configured to execute a NRS (number registration service) application for processing a request for a virtual SIM (subscriber identity module) for a mobile device in a computing environment, the network entity comprising a processor and memory storing programming instructions that, when executed by the processor, establish the NRS application, which comprises:
- a first interface for receiving a request for a virtual SIM for a mobile device, the request including information verified by a TTA (terminal trust anchor) embedded in the mobile device, wherein the information verified by the TTA comprises a token provided by the TTA, the token comprising digitally signed data by the TTA, wherein the virtual SIM is used to enable a user of the mobile device to make and receive calls;
- a TTA authentication module for verifying the request;
- a module for generating a mobile number for the mobile device, an international mobile subscriber identity (IMSI) number for the device, and network access credentials for the device; and
- a second interface for forwarding to a PCSS (private cloud storage service) application the request and information identifying the TTA embedded in the mobile device, wherein the PCSS application provides the virtual SIM for the mobile device.

18. The telecommunications network entity as claimed in claim 17, wherein the first interface is different from the second interface.

19. The telecommunications network entity as claimed in claim 17, wherein the application further comprises a client package (CP) provisioning module for provisioning a client application for the mobile device in response to a request from the mobile device.

20. The telecommunications network entity as claimed in claim 17, wherein the application further comprises one or more network operator modules for generating network access data in response to the request for a virtual SIM for the mobile device.

21. The telecommunications network entity as claimed in claim 20, wherein the first interface is adapted to forward the request for a virtual SIM for the mobile device to a selected one of the network operator modules based on information in the request identifying a preferred network operator.

22. A non-transitory computer-readable medium containing instructions that, when executed by a processor, cause the processor to carry out a method as defined in claim 1.

* * * * *